United States Patent
Kleiner et al.

[11] 3,944,594
[45]*Mar. 16, 1976

[54] POLYALKYLENE GLYCOL ESTERS OF HINDERED PHENOLS SUBSTITUTED ALKANOIC ACID

[75] Inventors: Eduard K. Kleiner, New York; John D. Spivack, Spring Valley, both of N.Y.

[73] Assignee: Ciba-Geigy Corporation, Ardsley, N.Y.

[ * ] Notice: The portion of the term of this patent subsequent to Nov. 16, 1991, has been disclaimed.

[22] Filed: Nov. 23, 1973

[21] Appl. No.: 418,706

Related U.S. Application Data

[63] Continuation-in-part of Ser. No. 52,724, July 16, 1970, abandoned.

[52] U.S. Cl. ............... 260/473 S; 44/70; 252/407; 260/45.85 S; 426/321
[51] Int. Cl.² ................ C07C 69/76; C07C 69/78
[58] Field of Search ............................ 260/473 S

[56] References Cited
UNITED STATES PATENTS

| | | | |
|---|---|---|---|
| 3,422,059 | 1/1969 | Taylor et al. | 260/473 S |
| 3,497,549 | 2/1970 | Dexter et al. | 260/473 S |

FOREIGN PATENTS OR APPLICATIONS

| | | | |
|---|---|---|---|
| 2,133,374 | 1/1972 | Germany | 260/473 S |
| 874,236 | 8/1961 | United Kingdom | 260/473 S |
| 7,364,045 | 9/1973 | Japan | 260/473 S |

*Primary Examiner*—John F. Terapane
*Attorney, Agent, or Firm*—Nestor W. Shust

[57] ABSTRACT

Compounds of the formula:

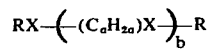

wherein
X is oxygen or sulfur,
a is an integer from 2 to 6,
b is an integer from 3 to 40, and
R is

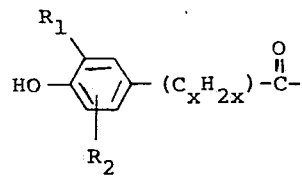

wherein
$R_1$ is an alkyl group of 1 to 8 carbon atoms,
$R_2$ is hydrogen or an alkyl group of 1 to 8 carbon atoms, and
x is an integer from 0 to 6 are useful as antioxidants for organic materials normally subject to oxidative deterioration, such as polyacetals, polypropylene, and nylon, in amounts of from about 0.005 to about 5% by weight of the composition.

11 Claims, No Drawings

POLYALKYLENE GLYCOL ESTERS OF HINDERED PHENOLS SUBSTITUTED ALKANOIC ACID

This application is a continuation-in-part of copending application Ser. No. 52,724, filed July 16, 1970, now abandoned.

DETAILED DISCLOSURE

The present invention deals with novel hindered phenolic esters of oligomeric glycols and thioglycols and organic materials subject to oxidative deterioration stabilized with said compounds.

The hindered phenolic esters of oligomeric glycols and thioglycols are of the formula

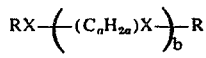

wherein
X is oxygen or sulfur
$a$ is an integer from 2 to 6,
$b$ is an integer from 3 to 40, and
R is

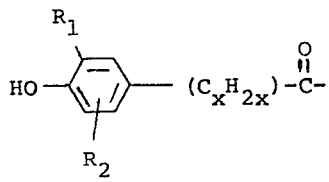

wherein
$R_1$ is an alkyl group from 1 to 8 carbon atoms,
$R_2$ is hydrogen or an alkyl group from 1 to 8 carbon atoms, and
$x$ is an integer from 0 to 6.

Although $R_2$ can be hydrogen, it is preferable that both $R_1$ and $R_2$ are alkyl groups of 1 to 8 and preferably of 1 to 4 carbons. Particularly preferable is when both said groups are branched alkyl or when $R_1$ is branched alkyl and $R_2$ is either methyl or a branched alkyl group such as isopropyl, tert-butyl and tert-octyl. Most preferably $R_1$ and $R_2$ are tert-butyl and tert-octyl groups. The $R_2$ group can be either in the ortho position to the hydroxyl group or in meta position to the hydroxyl and para to $R_1$. Preferably, however, $R_2$ is in the ortho position to the hydroxyl.

The integer $a$ is from 2 to 6, but for economic reasons integer 2 is preferred. The integer $b$ is from 3 to 40, but a particularly important range is from 3 to 30. The integer $x$ is from 0 to 6 but 0 and 2 are particularly preferred.

The compounds of the present invention may be prepared from the appropriate acids, acid chlorides or lower alkyl esters and glycols or thioglycols using well-known esterification methods. Starting materials for preparing the compounds of this invention are commercially available and/or can be prepared according to procedures familiar to those skilled in the art.

An alternative method, in the case of esters of this invention derived from hindered hydroxyphenyl propionic acid, comprises esterifying the oligomeric glycol or thioglycol with acrylic acid and thereafter adding the hindered phenol via a Michael addition.

Listed below are the illustrative examples of glycols and thioglycols that can be employed in preparing the compounds of this invention:
Diethylene glycol
Triethylene glycol
Tetraethylene glycol
Polyethylene glycol of the formula
$HO(CH_2CH_2O)_nH$
where $n$ is 5 to 40
Dipropylene glycol
Tripropylene glycol
Tetrapropylene glycol
Polypropylene glycol
2-{2-(3-hydroxyethoxy)propoxy}ethanol
3-{3-(2-hydroxypropoxy)ethoxy}propanol
2-{2-(2-hydroxypropoxy)ethoxy}propanol
2-{2-(2-hydroxyethyl)thioethyl}thioethanol.

The phenolic ester compounds of the present invention are useful as stabilizers of organic materials normally subject to oxidative deterioration. Such organic materials include: synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated aldehydes and unsaturated hydrocarbons such as butadienes and styrene; poly-$\alpha$-olefins such as polyethylene, polypropylene, polybutylene, and the like, including copolymers of poly-$\alpha$-olefins; polydienes such as polybutadiene and polyisoprene; polyurethanes such as are prepared from polyols and organic polyisocyanates; polyamides such as polyhexamethylene adipamide and polycaprolactam; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene; ethylene-propylenediene(EPDM)rubber. Other materials which can be stabilized by the active compounds of the present invention include lubricating oils of the aliphatic ester type, e.g., di(2-ethylhexyl) azelate, pentaerythritol tetracaproate, and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluids, waxes, resins, and the like; fatty acids such as soaps and the like.

Although the phenolic esters of this invention are very useful in stabilizing all of the substrates listed above, they are particularly effective in the stabilization of polyolefins such as polyethylene and polypropylene, polyacetals, EPDM rubber, styrene-butadiene (SBR) rubber and polybutadiene.

Besides the antioxidant activity the compounds of this invention are also effective as light stabilizers. In such instances it is often advantageous to employ them in combination with known antioxidants such as for example di-n-octadecyl (3,5-di-t-butyl-4-hydroxybenzyl)phosphonate.

In general the stabilizers of this invention are employed in amounts of from about 0.005 to about 5% by weight of the composition. A particularly advantageous range is from about 0.01%, with from about 0.05% to about 1% most preferred.

The stabilizers employed in this invention may be used alone or in combination with other stabilizers or additive materials. Especially useful in certain cases is a composition containing an active compound of the present invention with a synergists dilauryl β--thiodipropionate.

Especially useful with the stabilizer compounds of the present invention are synergists of the formula:

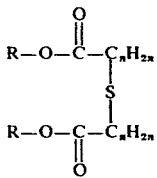

wherein

R is an alkyl group having from 6 to 24 carbon atoms; and n is an integer from 1 to 6.

Other antioxidants, antiozonants, thermal stabilizers, ultraviolet light absorbers, coloring materials, dyes, pigments, metal chelating agents, etc., may also be used, in combination, with the compounds of the present invention.

The following examples set forth the manner and the process of making typical embodiments of the invention, without being a limitation thereof, and include the best mode contemplated for carrying out the invention.

EXAMPLE 1 a. Polytetramethylene ether glycol bis-{3-(3,5-di-tert.-butyl-4-hydroxyphenyl)propionate}

200 milligrams of lithium hydride and 168 grams of polytetramethylene ether glycol (mol. wt. 670) are warmed together in a nitrogen atmosphere at about 50°C until the gas evolution stops. 154 grams of methyl 3-(3,5-di-tert.-butyl-4-hydroxyphenyl) propionate is then added, the reaction vessel is thoroughly purged with nitrogen and heated at 138–138°C for 1.5 hours at atmospheric pressure and at a 148°–150°C and 15 mm. Hg. pressure for an additional 3.75 hours. 20.8 ml of methanol is collected during this period. The reaction mixture is cooled to room temperature and neutralized with 3 grams of acetic acid. The reaction mixture is then dissolved in 700 ml of benzene, successively washed with water, saturated sodium bicarbonate solution, saturated sodium chloride, and finally water. The benzene solution is then dried over sodium sulfate and the solvent removed at reduced pressures. Yield: 264 grams of a viscous residual oil.

Analysis: Equivalent Weight on titration with tetrabutylammonium hydroxide - 580 Refractive Index ($n_D^{22}$) - 1.4960.

b. polytetramethylene ether glycol bis-{3-(3,5-di-tert.-butyl-4-hydroxyphenyl)propionate}

The general procedure employed in A is repeated but reacting 220 grams of polytetramethylene ether glycol (mol. wt. 2000) and 73.5 grams of methyl 3-(3,5-di-tert.-butyl-4-hydroxyphenyl)propionate in the presence of 95 milligrams of lithium hydride as catalyst. The product is isolated as a viscous almost colorless, oil.

Analysis: Equivalent weight on tritration with tetrabutylammonium hydroxide - 1119 Refractive Index ($n_D^{22}$) - 1.4807.

EXAMPLE 2

The procedure of Examole 1 (a) is repeated, but employing in place of the methyl 3-(3,5-di-tert.-butyl-4-hydroxyphenyl)-propionate, stoichiometrically equivalent amounts of the following esters:

a. methyl 3,5-di-t-butyl-4-hydroxyphenylacetate
b. methyl 3,5-di-t-butyl-4-hydroxybenzoate
c. methyl 6-(3,5-di-t-butyl-4-hydroxyphenyl) hexanoate to yield the corresponding esters of polytetramethylene ether glycol.

EXAMPLE 3

Tetraethylene glycol bis{3-(3,5-di-tert.-butyl-4-hydroxyphenyl)propionate}

4.1 grams of sodium methylate is added to 48.5 grams of tetraethylene glycol at 60°C in a dry nitrogen atmosphere and stirred until dissolved. 100 grams of methyl 3-(3,5-di-tert.-butyl-4-hydroxyphenyl)propionate is added and the reaction mixture heated at 150°–154°C. 10.2 ml of methanol is collected in a Dean Stark trap over a period of 2 hours. The reaction mixture is then heated at 20 mm Hg. pressure for an additional 25 hours during which an additional 9.5 ml of methanol is collected. The reaction mixture is dissolved in a solvent mixture of about 700 ml of benzene and ether, and neutralized with glacial acetic acid. The solution is then washed with water, sodium carbonate solution, water, and finally dried over sodium sulfate. The crude product is recovered by removing the benzene and ether solvent under reduced pressure. Unreacted methyl 3-(3,5-di-tert.-butyl-4-hydroxyphenyl) propionate and other volatile impurities are removed by distillation with a wiped film evaporator, the wall temperature being first 180° to 200°C, then 255°C, the pressure being in the range of 1 to 5 microns. The product thus isolated is a syrupy liquid.

| Analysis | |
|---|---|
| | Neutralization Equivalent Weight |
| Calculated: | 357.5 |
| Found: | 378 |

EXAMPLE 4

Triethylene glycol bis{3-(3,5-di-tert.-butyl-4-hydroxyphenyl)propionate}

193 grams of methyl 3-(3,5-di-tert.-butyl-4-hydroxyphenyl)propionate and 0.266 grams of lithium hydride are mixed together in a dry nitrogen atmosphere. 45 grams of triethylene glycol were added and the reaction mixture heated on an oil bath for 10.75 hours at a temperature of 115° and for an additional 5 hours at 115°–152°C. 17.5 ml of methanol is collected during this period. The reaction mixture is cooled to room temperature and 3.6 ml of acetic acid added. The mixture is poured into 600 ml of heptane. The product crystallizes upon seeding, is filtered, recrystallized twice from 800 ml of heptane. Yield 163.4 g of white crystalline product. m.p. 109.5°–110°C.

Analysis for $C_{40}H_{62}O_8$: Calculated: C, 71.61, H, 9.32 Found: C, 71.35, H, 9.39

EXAMPLE 5

Polyethylene glycol bis{3-(3,5-di-t-butyl-4-hydroxyphenyl)propionate}

13.7 grams of polyethylene glycol $H(OCH_2CH_2)_{8-9}OH$, Carbowax 400 are dissolved in dry pyridine. To the solution there is slowly added 22 grams of a 33% benzene solution of 3-(3,5-di-tert.-butyl-4-hydroxyphenyl)propionyl chloride. During the addition of the chloride the temperature is maintained at 13° to 15°C. The reaction mixture is then maintained at room temperature for one hour and thereafter the precipitated pyridine hydrochloride is removed by filtration. The filtrate is washed with 2N hydrochloric acid and water. The benzene layer is dried over sodium sulfate and the solvent removed. The resulting milky viscous oil is dried at high vacuum yielding 31 grams of mixed diesters.

EXAMPLE 6

The general procedure of Example 5 is repeated but employing polyethylene glycol of different molecular weights as follows:
  a. molecular weight 950 – 1050: Carbowax 1000
  b. molecular weight 500 – 600: Carbowax 1500 W.

EXAMPLE 7

Triethyleneglycol-bis-{3-(3-tert.butyl-4-hydroxy-5-methylphenyl)propionate}

15 grams of triethyleneglycol (0.10 moles), and 0.48 grams of lithium amide were heated together with 55.5 grams of ethyl 3- (3-tert.-butyl-5-methyl) propionate at 125°C when ethanol began to evolve. The reaction mixture was then heated at 130° to 135°C for 105 hours and at 155° to 157° for 3.75 hours during which 11.4 ml of ethanol was distilled. Finally, the melt was heated at 155° to 157°C at 15 mm Hg for 1.5 hours. 1.6 grams of glacial acetic acid was added to the melt at 50°C the color changing from purple to yellow. The product was dissolved in 150 ml of benzene and the turbid solution successively washed with water, 6N aqueous hydrochloric acid, 2N aqueous sodium hydroxide and finally water until neutral. After drying over anhydrous sodium sulfate, the benzene was removed by distillation at reduced pressures. The isolated residue was triturated with heptane, and cyclohexane during which crystallization occured. The crystals were filtered and recrystallized from a solvent mixture of 150 ml isopropanol and 60 ml of water and finally recrystallized from nitromethane. White crystals were obtained melting at 76° to 78°C.

EXAMPLE 8

Triethylene glycol-bis-(3,5-di-t-butyl-4-hydroxybenzoate)

21.5 grams of 3,5-di-tert.-butyl-4-hydroxybenzoyl chloride (0.08 moles) dissolved in dry toluene to make 81.7 ml was added dropwise at 10° to 15°C over a period of 10 minutes to a dispersion of 6.0 grams of triethyleneglycol (0.04 moles) and 10.3 grams of N,N-dimethylaniline (0.085 moles) in 250 ml of dry toluene. The turbid reaction mixture was then allowed to stir overnight at room temperature (about 19 hours). The reaction mixture was then heated at 80° to 85°C for 2 hours. The reaction mixture was then filtered of insolubles and the toluene filtrate was successively washed with water, 2N sodium hydroxide, and water until neutral. After drying the toluene solution over anhydrous sodium sulfate, the toluene was removed by distillation at reduced pressure. The residue from toluene was crystallized first from n-heptane, and then from a solvent mixture of 200 ml of heptane and 15 ml of isopropanol, and finally from n-heptane. White crystals of the desired product melted at 88° to 91°C.

Oven Aging Tests

Since the oxidation of organic material is slow at ambient temperatures, even in the absence of antioxidants, the testing of the effects of antioxidants must be conducted at high temperatures in order to obtain results within a convenient time.

The procedure used involved thoroughly blending unstabilized polypropylene powder, (Hercules Profax 6501) with a stabilizer as shown in Table I below. The blended material was then milled on a two-roller mill at 182°C for 5 minutes, after which time the stabilized polypropylene was sheeted from the mill and allowed to cool.

The milled polypropylene sheet was then cut into smaller pieces and pressed for seven minutes on a hydraulic press at 218°C and 2,000 pounds per square inch pressure. The resultant sheet of 25 mil thickness was tested for resistance to accelerated aging in a forced draft oven at 150°C. The first sign of decomposition (e.g., cracking or browning on the edges) is noted as the failure time.

TABLE I

Oven Aging of Polypropylene at 150°C

| Ex. No. | % of Stabilizer | Time to Failure |
|---|---|---|
| 9 | None | 3 hrs. |
| 10 | 0.1% Compound of Ex. 4<br>0.3% DSTDP | 1150 hrs. |
| 11 | 0.1% Compound of Ex. 1(a)<br>0.3% DSTDP | 1250 hrs. |
| 12 | 0.1% Compound of Ex. 1(b)<br>0.3% DSTDP | 620 hrs. |
| 13 | 0.2% Compound of Ex. 7 | 485 hrs. |
| 14 | 0.1% Compound of Ex. 7<br>0.3% DSTDP | 1790 hrs. |

EXAMPLE 15

A mixture of nylon 66 flakes and .5% by weight of the compound of Example 4 is extruded from a commercial three-quarter inch 24:1 L/D extruder at about 280°C. The stabilized sample when heated in a forced air oven at 140°C retains over 50% of the original specific viscosity for 108 hours whereas an unstabilized sample retains over 50% original viscosity for 14 hours.

EXAMPLE 16

0.5 grams of the compound of Example 4 and an equal amount of rosin acid together with 50 ml of water are homogenized to form a stable dispersion. This dispersion is added to 500 ml of SBR latex emulsion (SYNPOL 1500, Texas U.S. Chemical Co.) in a two liter beaker with vigorous stirring. The emulsion is coagulated by the addition of 6% sodium chloride solution with vigorous stirring until a pH of 3.5 is reached and the stirring then continued for approximately one-half hour. The dispersion is strained through a cheesecloth and then rinsed with distilled water. 5 × 5 inch × 25 mil plaques are pressed at 125°C for 3 minutes under 20 tons of ram force. The blocks are cut into 1 inch × 1 ½ inch specimens, placed on aluminum sheets and exposed in a forced draft oven at 100°c and examined at following intervals 12, 24, 48 and 96 hours. The 0.5 gram samples of the specimens are each then dissolved in 100 ml of toluene and the viscosity of the resulting solution determined with a Cannon Fenske Series 75 viscometer at 75°C in a constant temperature water bath. The toluene solutions are also tested for gel content. Results obtained compare to that of unstabilized SBR are given in the following table.

TABLE II

| | Percent Retention of Specific Viscosity of Emuslion SBR at Indicated Aging Time | | |
|---|---|---|---|
| | 12 hrs. | 24 hrs. | 41 hrs. |
| Unstabilized | Gel | Gel | Gel |
| Compound of Ex. 4 | 92 | 92 | 20 |
| Compound of Ex. 1 | 61 | 55 | Gel |
| Compound of Ex. 2 | 57 | Gel | Gel |

EXAMPLE 17

0.5 grams of the compound of Example 4 are incorporated in 100 grams of unstabilized polyacetal resin by mixing with a Brabender Plasticorder at 200°C for 7 minutes as follows: During 0–15 seconds rpm is 20 and one-half the pellets of polyacetal are added to the mixing chamber; 15–30 seconds, rpm 20, the stabilizer compound is added; 30 seconds-1 minute, rpm 20, add remained pellets of polyacetal resin; 1–2 ½ minutes raise RPM slowly to 100 pack and close; 2 ½–7 minutes maintain rpm at 100. The molten sample is then quenched with distilled water and removed. The sample is then pressed into 25 mil sheet at 230°C and 6000 p.s.i. Small strips (5.000 grams) of the 25 ml polyacetal sheet are weighed in a previously weighed culture tube (25 × 125 mm). The tubes are then placed on a metal rack on a rotating shelf in a forced draft oven at 230°C for 45 minutes. After removal from the oven, the tubes containing the samples are weighed and the weight loss is calculated as a % of the original weight. The stabilized sample loses less than 2% of its original weight.

EXAMPLE 18

Commercial polyacetal resin (Celon) was extracted three times with freshly distilled ethylene dichloride. The extractions were carried out with stirring at 65°C for 24 hours the first two times and for 4 hours the third time. The resulting antioxidant-free resin, after drying under vacuum to remove solvent, was used for antioxidant testing. The solvent extraction removed the antioxidant completely but did not extract the acid acceptor dicyandiamide.

0.25 g of the antioxidant to be tested was incorporated into 50 g of the extracted resin by milling for 7 minutes at 200°C on the Brabender Plasti-Corder. The milled formulation was subsequently pressed into a 40 mil sheet at 215°C and 350 psi for 90 seconds then cooled quickly in a cold press at 350 psi. These sheets are subsequently remolded for 2 minutes at contact pressure and for 3 minutes at 350 psi at 215°C to give plaques 1 ½ in. × 2 ¼ in. by 125 mil.

Duplicate samples are weighed and aged in a forced draft oven at 140°C and weight loss is determined periodically. Time to 4% weight loss is determined by graphing the data obtained and extrapolating to 4% loss. The results are presented in the following Table:

TABLE III

| Polyacetal Oven Aging | |
|---|---|
| Antioxidant | Hours to 4% Weight Loss |
| 0.5% Compound of Ex. 1 | 1850 |
| 0.5% Compound of Ex. 7 | 2060 |

EXAMPLE 19

The antioxidant present in the EPDM rubber (Epsyn 70A from Copolymer Rubber Co), was extracted by dissolving the rubber three times in toluene and re-precipitating it with isopropanol. The rubber from the third reprecipitation was dried to constant weight under vacuum.

Toluene solutions were prepared containing 2.5% by weight of the extracted EPDM rubber and 0.0025% by weight of the antioxidant to be evaluated (antioxidant concentration in rubber was 0.1% by weight of rubber). Five drops of the resulting solution was placed in 1 in. diameter, sodium chloride disc, spread quickly to obtain uniform coverage, and the solvent was evaporated quickly to give a thin rubber film. The thickness of the film was determined by the C-H infrared absorption band at 1460 cm$^{-1}$ using the baseline method. The desired thickness corresponded to a C-H absorbance of 0.25 at 1460 cm$^{-1}$. In this thickness region the period to failure was found to be proportional to thickness.

The rubber film on sodium chloride disc was placed in a draft oven at 150°C which was operated at the minimum draft setting. The samples were checked periodically for the carbonyl absorbance at 1715 cm$^{-1}$ by the baseline method. A sample was considered to have failed when 0.02 carbonyl absorbance was reached. After the result of hours to failure was obtained, it was corrected to compensate for any difference in thickness that may exist between the film sample (as determined above) and the desired thickness of 0.25 at 1460 cm$^{-1}$. The date are given in the following table.

TABLE IV

| EPDM Rubber Oven Aging | |
|---|---|
| Antioxidant | Hours to Failure |
| None | 1.8 |
| 0.1% Compound of Ex. 1 | 11.2; 12.8 |
| 0.1% Compound of Ex. 2 | 5.4; 4.7; 4.5 |
| 0.1% Compound of Ex. 4 | 13.1 |

EXAMPLE 20

Solution polymerized polybutadiene (Solprene 201 from Phillip Petroleum Co), (30 g) was dissolved in toluene (500 ml) with stirring and added slowly into 2500 ml isopropanol with vigorous stirring. The precipitated rubber was separated by filtration. This solution-precipitation treatment was repeated twice. The finally precipitated rubber was dried in a vacuum oven at room temperature. A 5% by weight solution of this unstabilized rubber was prepared in toluene and stored under a nitrogen atmosphere.

The samples were prepared following the procedure described in Example 19 and the resulting samples were tested in the same manner as EPDM rubber samples in Example 19. The data obtained from this test is reported in the table below.

TABLE V

Polybutadiene Rubber Oven Aging

| Antioxidant | Hours to Failure |
|---|---|
| None | 2 |
| 0.1% Compound of Ex. 1 | 33; 28; 34; 29 |

What is claimed is:

1. A compound of the formula:

wherein
 $a$ is an integer from 2 to 6,
 $b$ is an integer from 3 to 40, and
 R is

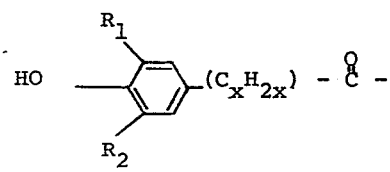

wherein
 $R_1$ and $R_2$ are alkyl group of 1 to 8 carbon atoms,
 $x$ is an integer from 0 to 6.

2. A compound of claim 1 wherein $R_1$ and $R_2$ are tertiary alkyl of 4 to 8 carbon atoms.

3. A compound of claim 1 wherein $R_1$ and $R_2$ are tert-butyl groups.

4. A compound as claimed in claim 3 wherein $a$ is 2.

5. A compound as claimed in claim 3 wherein $a$ is 4.

6. A compound of claim 4 wherein $x$ is 2.

7. A compound of claim 5 wherein $x$ is 2.

8. A compound of claim 1 which is polytetramethylene ether glycol bis{3-(3,5-di-tert.-butyl-4-hydroxyphenyl)propionate}.

9. A compound of claim 1 which is tetraethylene glycol bis{3-(3,5-di-tert.-butyl-4-hydroxyphenyl)propionate}.

10. A compound of claim 1 which is triethylene glycol bis{3-(3,5-di-tert.-butyl-hydroxyphenyl)propionate}.

11. A compound of claim 1 which is polyethylene glycol bis{3-(3,5-di-tert.-butyl-4-hydroxyphenyl)propionate}.

* * * * *